US010088851B2

(12) United States Patent
Huck et al.

(10) Patent No.: US 10,088,851 B2
(45) Date of Patent: Oct. 2, 2018

(54) THERMOSTATIC MIXING VALVE

(71) Applicant: Grohe AG, Hemer (DE)

(72) Inventors: Kai Huck, Wetter (DE); Tanja Schwartpaul, Neuenrade (DE); Achim Mielke, Porta Westfalica (DE)

(73) Assignee: GROHE AG, Hemer (DE)

( * ) Notice: Subject to any disclaimer, the term of this patent is extended or adjusted under 35 U.S.C. 154(b) by 635 days.

(21) Appl. No.: 14/543,224

(22) Filed: Nov. 17, 2014

(65) Prior Publication Data
US 2015/0168960 A1 Jun. 18, 2015

(30) Foreign Application Priority Data
Nov. 15, 2013 (DE) .................... 10 2013 019 074

(51) Int. Cl.
*G05D 23/13* (2006.01)
*E03C 1/04* (2006.01)
*G05D 23/19* (2006.01)

(52) U.S. Cl.
CPC .......... *G05D 23/1313* (2013.01); *E03C 1/04* (2013.01); *G05D 23/1393* (2013.01); *G05D 23/1925* (2013.01)

(58) Field of Classification Search
CPC .......... G05D 23/1393; G05D 23/1313; G05D 23/1925
USPC ...................................... 236/12.12
See application file for complete search history.

(56) References Cited

U.S. PATENT DOCUMENTS

| 9,127,779 B2 * | 9/2015 | Rivlin | G05D 23/1393 |
| 2004/0000594 A1 * | 1/2004 | Beck | G05D 23/1346 |
| | | | 236/12.15 |

FOREIGN PATENT DOCUMENTS

| DE | 10 2006 032 018 A1 | 1/2008 | |
| DE | 10 2008 058 515 A1 | 5/2010 | |
| DE | 102008058515 A1 * | 5/2010 | ......... G05D 23/1393 |
| GB | 2143343 A * | 2/1985 | ......... G05D 23/1393 |
| WO | WO 2010057583 A1 * | 5/2010 | ......... G05D 23/1393 |

* cited by examiner

*Primary Examiner* — Jianying Atkisson
*Assistant Examiner* — Meraj A Shaikh
(74) *Attorney, Agent, or Firm* — Muncy, Geissler, Olds & Lowe, P.C.

(57) ABSTRACT

A thermostatic mixing valve for mixing cold water and hot water and for setting a mixed water temperature, having an electric motor that is controllable by a control unit and acts via a gear stage on a valve body, which is stroke-adjustable over a setting range and with which the mixing ratio between hot and cold water can be varied depending on a target mixed water temperature, presettable on the user side, and having a sensor element for detecting at least one set position in the setting range of the thermostatic mixing valve. The gear stage has a linearly adjustable linear displacement element, arranged rotationally fixed and provided between the electric motor and the valve body, and the sensor element works together with the linear displacement element to detect the set position.

12 Claims, 2 Drawing Sheets

THERMOSTATIC MIXING VALVE

This nonprovisional application claims priority under 35 U.S.C. § 119(a) to German Patent Application No. 10 2013 019 074.6, which was filed in Germany on Nov. 15, 2013, and which is herein incorporated by reference.

BACKGROUND OF THE INVENTION

Field of the Invention

The present invention relates to a thermostatic mixing valve for mixing cold water and hot water and to setting the mixed water temperature.

Description of the Background Art

The structure and operating mode of such a thermostatic mixing valve is disclosed, for example, in DE 10 2006 032 018 A1, according to which the thermostatic mixing valve for setting the mixing water temperature can be built into a sanitary fitting, for instance, into a shower.

DE 10 2008 058 515 A1 discloses a generic thermostatic mixing valve, in which the setting of the mixed water temperature is no longer preset manually via an operating knob by the user, but rather the thermostatic mixing valve can be controlled remotely by the user. To this end, the thermostatic mixing valve has an electric motor that acts via a gear stage on a stroke-adjustable valve body with which the size of hot water and cold water control openings can be varied over a setting range, namely, depending on a target mixed water temperature value set by the user.

In DE 10 2008 058 515 A1, the electric motor is assigned a sensor element for detecting at least one set position of the thermostatic mixing valve. The sensor element is a switch that operates together with a cam ring rotationally coupled to the electric motor. The cam ring has two cams of different sizes by which the setting range of the thermostatic mixing valve can be established and/or a calibration set position can be detected for calibrating the mixing valve.

For a reliable detection of the setting range of the mixing valve, it is provided in DE 10 2008 058 515 A1 that the electric motor rotational angle traversed during the setting process is designed much smaller than one rotation, i.e., smaller than 360°. However, this greatly reduces the available setting range for the thermostatic mixing valve. In addition, the arrangement of the switch and the cam ring in the thermostatic mixing valve is intensive in terms of both space and parts.

In DE 10 2008 058 515 A1 the drive spindle of the electric motor is furthermore coupled rotationally fixed via a spline to an adjusting nut, designed space-intensively and approximately cup-shaped in cross section. The cup-shaped adjusting nut has an inner thread that works together with an outer thread of the overload unit. In a setting process, the adjusting nut is caused to rotate, resulting in a corresponding stroke movement of the overload unit.

SUMMARY OF THE INVENTION

It is therefore an object of the present invention to provide a thermostatic mixing valve whose available setting range is increased by simple means and with reduction of the required installation space and parts.

The invention is based on the situation that in DE 10 2008 058 515 A1, which is incorporated herein by reference, the detection of the rotational position of the electric motor and the establishing of the controllable setting range of the thermostatic mixing valve are limited to an electric motor rotational angle of far less than 360°. Against this background, a gear stage, connected between the electric motor and the valve body, has a linear displacement element which is arranged rotationally fixed and is linearly adjustable. The linear displacement element is connected into the force path of the gear stage and acts as a signal generator together with the sensor element in order to detect the set position of the electric motor. In this way, the position detection no longer occurs via a cam ring with the associated switch, but rather by the linear displacement element. As a result, set positions can be detected by the sensor element independent of the electric motor rotational angle traversed during the setting process. With the arrangement of the invention, the setting range of the mixing valve can be easily designed so that it extends between the supply temperatures of the cold water and hot water.

The set positions detectable by the sensor element are, for example, a bottom set position and a top set position, which define the available, controllable setting range of the thermostatic mixing valve. In addition, the sensor element can detect an additional calibration set position, which is approximately in the middle between the bottom and top set position. In a complete pass through the setting range, the traversed electric motor rotational angle can be greater than 360°.

In a technical realization, the gear stage of the thermostatic mixing valve can have as the input element a drive spindle of the electric motor. This is operationally connected to the linear displacement element. An especially simple operational connection results when the drive spindle has an outer thread which is in engagement with a radially outward inner thread of the linear displacement element. The linear displacement element is arranged preferably coaxially to the drive spindle of the electric motor. In a further embodiment, the linear displacement element can form the output element of the gear stage, which acts directly or indirectly on the valve body. It is preferred if the linear displacement element does not act directly on the valve body but indirectly via an overload unit and a thermostatic element. The overload unit is elastically flexible in an excessively large force application. With the aid of the thermostatic element, temperature fluctuations in the mixed water temperature are balanced out in that its overall length is variable depending on the temperature fluctuations, as a result of which the size of the cold water and hot water control opening is adjusted accordingly. The structure and mode of action of the thermostatic element can be identical to the thermostat disclosed in DE 10 2008 058 515 A1.

In an embodiment favorable in terms of installation space, the overload unit can be a cylindrical sleeve. It is mounted linearly adjustable in an axial direction in a bore of a valve housing (i.e., the head piece). In addition, the sleeve can have a front wall which faces the linear displacement element and with which the linear displacement element can be brought into pressure contact. On the front side facing away therefrom, a thrust member is mounted elastically flexible by means of a return spring. The thrust member of the overload unit is in contact with the thermostatic element, which in turn is motion-coupled to the valve body.

In a stroke adjustment of the linear displacement element, both the overload unit and the thermostatic element, connected downstream in the force flow direction, are stroke-adjusted with the motion-coupled valve body with which the size of the cold water and hot water control opening can be set depending on the stroke path.

The overload unit, the thermostatic element, and the valve body together with the aforementioned valve housing (having the head piece and a hot water seat) preferably form a cartridge. The cartridge can be connected operationally as a subassembly unit to the electric motor and the linear displacement element.

In an embodiment, the linear displacement element can have a signal generator, for instance, a radially outwardly projecting vane, which works together with the sensor element. The vane may have slits, each of which corresponds to a predetermined set position. In contrast, the sensor element as an optical sensor with a light source can be arranged fixed to the housing and detect the positions of the slits.

The control unit for controlling the electric motor can be integrated as a controller in a control loop for regulating the actual mixed water temperature to the target mixed water temperature preset on the user side. To this end, the control loop can have a temperature sensor, which is arranged in a mixed water chamber of the thermostatic mixing valve and is in signal communication with the control unit of the electric motor.

The described embodiments and/or refinements of the invention as explained above can be employed individually or also in any combination thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
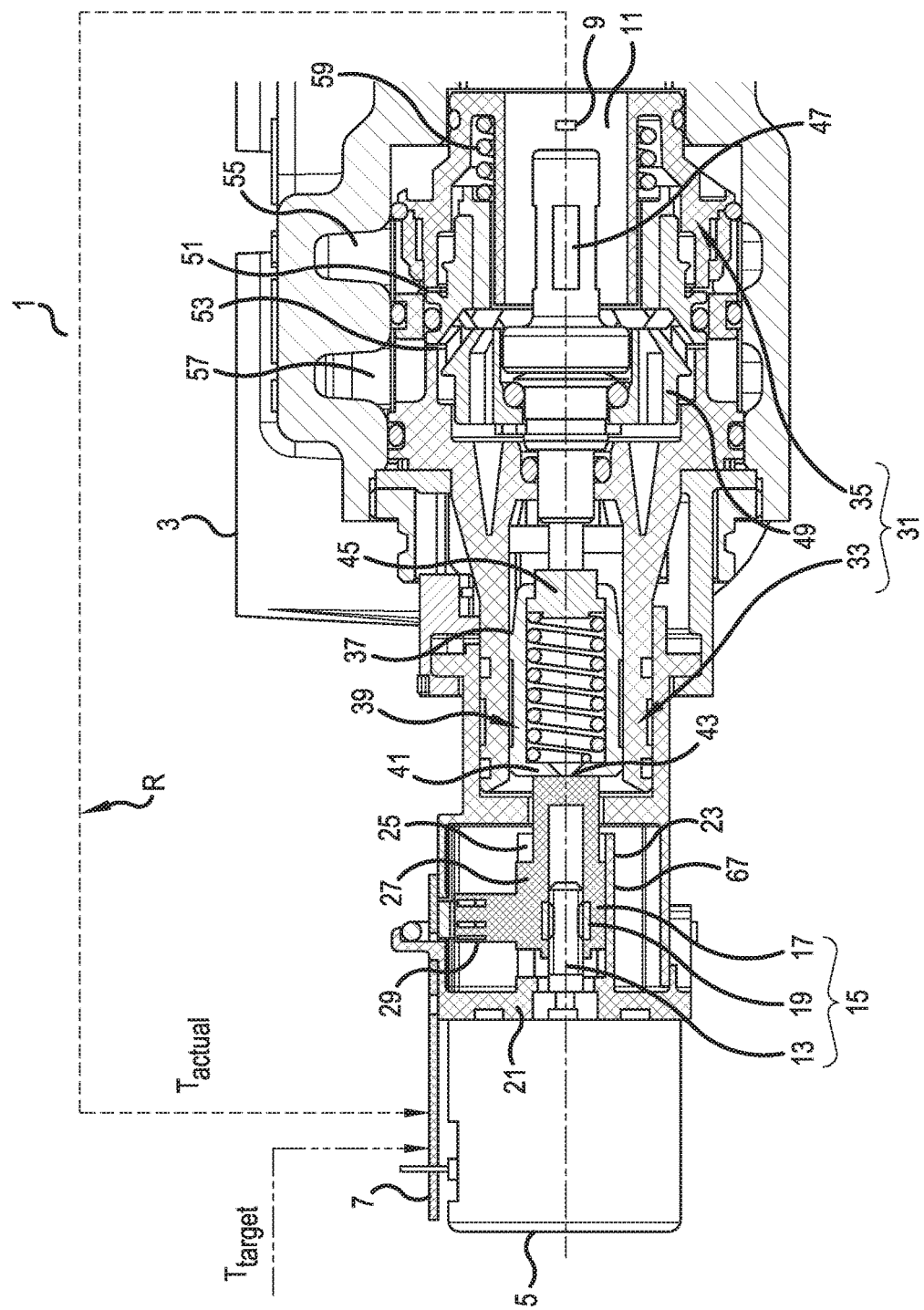
FIG. 1 illustrates in a sectional illustration, the thermostatic mixing valve in the mounting position.

In FIG. 1, thermostatic mixing valve 1 is shown in a mounting position, namely, in a sanitary fitting 3, for instance, for a shower. Thermostatic mixing valve 1 in the present case has no operating knob for a manual setting of the mixed water temperature, but rather an electric motor 5 whose control unit 7 has a contact-free signal connection (shown by the dashed arrows in FIG. 1) with a remote control unit operable by a user. The user transmits a desired target mixed water temperature $T_{target}$ to control unit 7 by means of the remote control unit. Control unit 7 together with electric motor 5 and temperature sensor 9, indicated in FIG. 1 and arranged in mixed water chamber 11, is integrated in a control loop R. Depending on the target mixed water temperature $T_{target}$, preset on the user side, via control loop R an adjustment occurs of the actual mixed water temperature $T_{actual}$ detected by temperature sensor 9 to the target mixed water temperature $T_{target}$, preset on the user side. To this end, control unit 7 generates a control signal by which electric motor 5 can be actuated to adjust mixing valve 1.

Electric motor 5 has a drive spindle 13 that forms an input element of gear stage 15. The output element of gear stage 15 forms a sleeve-shaped linear displacement element 17, on whose inner circumference an inner thread is provided that is engaged in thread engagement 19 with a corresponding outer thread of drive spindle 13. To attach control unit 7, indicated to be plate-shaped in FIG. 1, and linear displacement element 17, electric motor 5 has a supporting plate 21 with a sleeve-shaped bearing extension 23. Radially within sleeve-shaped bearing extension 23, linear displacement element 17 is mounted linearly movable but secured against rotation. For the rotationally fixed mounting, sleeve-shaped bearing extension 23 has a slit-shaped axial guidance 25, by which an axial segment 27 of linear displacement element 17 is guided with vane 29 attached thereto.

In FIG. 1, thermostatic mixing valve 1 moreover has a thermostatic cartridge 31 whose housing is formed by a head piece 33 and a so-called hot water seat 35. Thermostatic cartridge 31 has a recess 37, open in the direction of linear displacement element 17 and in which an overload unit 39 is arranged axially movable. Sleeve-shaped overload unit 39 on its side facing linear displacement element 17 is formed with a front wall 41 which during the setting process is in contact with face end 43 of linear displacement element 17. On its side facing away therefrom, overload unit 39 has a thrust member 45 that is mounted elastically flexibly and is in contact with a thermostatic element 47. Thermostatic element 47 together with a radially outer valve body 49 forms a motion-coupled unit, in which valve body 49 by axial adjustment can vary the size of the hot water and cold water control openings 51, 53. Control openings 51, 53 are fluidically in communication with hot and cold water lines 55, 57 in a manner known per se. The cold and hot water flowing through control openings 51, 53 is mixed in the downstream mixing chamber 11 and conveyed further to the shower head.

According to FIG. 1, the composite component mounted in cartridge 31 and having the thermostatic element 47, valve body 49, and overload unit 39, is pretensioned by means of a pretension spring 59 in the direction of linear displacement element 17.

During a setting process, drive spindle 13 of electric motor 5 is caused to rotate, as a result of which linear displacement element 17 is moved linearly by one setting adjustment. In this way, the composite component, having the overload unit 39, thermostatic element 47, and valve body 49, can be mounted axially opposite to the spring force of pretension spring 59 within cartridge 31. Control openings 51, 53 for the cold water and hot water are accordingly set in this way.

Figure 3:
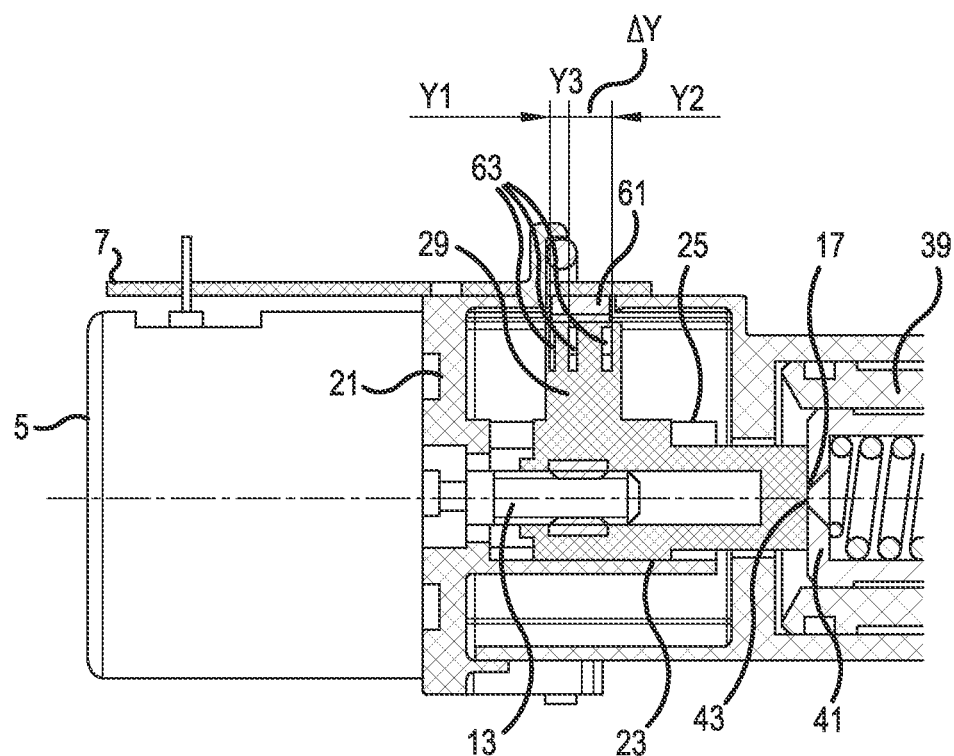
FIG. 3 illustrates, in an enlarged partial sectional illustration, a linear displacement element mounted in the mixing valve with an indicated mixing valve setting range $\Delta y$.

According to FIG. 3, the setting range $\Delta y$ of thermostatic mixing valve 1 is predefined by means of a sensor element 61. In the present case, sensor element 61 is an optical sensor that works together with three slits 63 on vane 29. The two outer slits 63 in the axial direction each correspond to a bottom set position $y_1$ and a top set position $y_2$, which define the available setting range $\Delta y$ of thermostatic mixing valve 1. The middle slit 63, in contrast, can represent a calibration set position of electric motor 5, for example.

Figure 2:
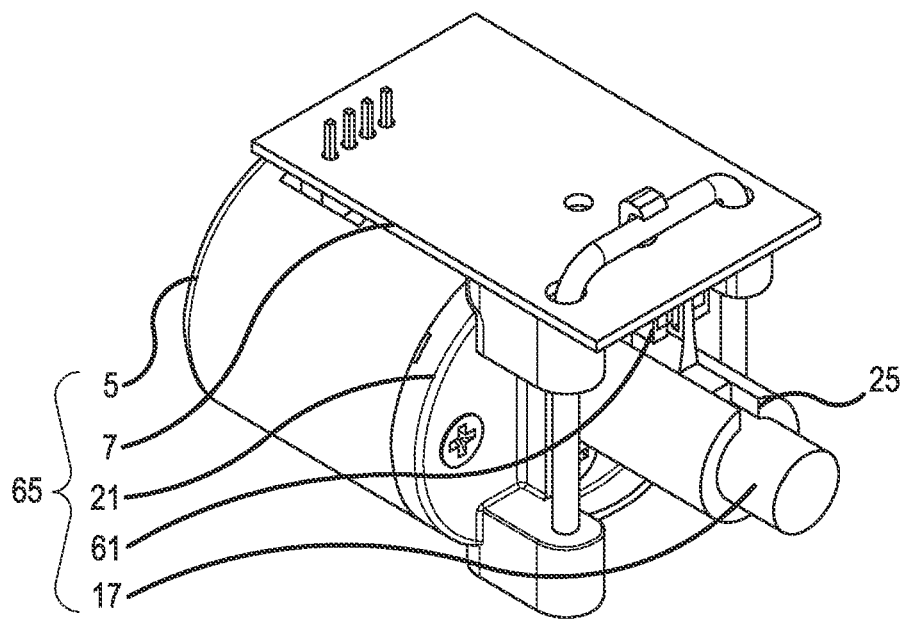
FIG. 2 shows a subassembly unit having an electric motor, a linear displacement unit, and an indicated control unit.

In FIG. 2, electric motor 5, linear displacement element 17, and optical sensor 61 are shown as a subassembly unit 65. As already noted, linear displacement element 17 together with optical sensor 61 are mounted on a support plate 21 of electric motor 5. The connection of subassembly unit 65 to thermostatic cartridge 31 occurs via a sleeve-shaped adapter part 67 (FIG. 1) in whose opposing front sides thermostatic cartridge 31 and subassembly unit 65 can be inserted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermostatic mixing valve for mixing cold water and hot water and for setting a mixed water temperature, the thermostatic mixing valve comprising:
   a valve body;
   an electric motor that is controllable by a control unit and acts via a gear stage on the valve body that is stroke-adjustable over a setting range and with which the mixing ratio between hot and cold water is varied depending on a target mixed water temperature that is presettable on a user side; and
   a sensor detecting at least one set position in the setting range of the thermostatic mixing valve,
   wherein the gear stage includes a linearly adjustable linear displacement shaft arranged rotationally fixed and provided between the electric motor and the valve body,
   wherein the sensor operates in conjunction with the linear displacement shaft to detect the at least one set position,
   wherein the entire linear displacement shaft acts indirectly on the valve body,
   wherein the electric motor is axially aligned with the linear displacement shaft and the valve body,
   wherein the electric motor has a rotatable drive spindle extending therefrom, the drive spindle being inserted inside of the linear displacement shaft,
   wherein an inner thread provided on an inner surface inside of the linear displacement shaft engages with an outer thread provided on an outer surface of the drive spindle, such that rotation of the drive spindle causes linear adjustment of the linear displacement shaft, and
   wherein the gear stage further includes the inner thread, the outer thread and the drive spindle, such that the electric motor acts on the valve body via the drive spindle and the linear displacement shaft that are in engagement by the inner thread and the outer thread.

2. The thermostatic mixing valve according to claim 1, wherein the at least one set position detectable by the sensor includes a bottom set position and a top set position defining the setting range of the thermostatic mixing valve.

3. The thermostatic mixing valve according to claim 1, wherein a size of the setting range of the thermostatic mixing valve is independent of the electric motor rotational angle traversed during the setting of the mixed water temperature, and wherein, in a complete pass through the setting range, a traversed rotational angle of the electric motor is greater than 360°.

4. The thermostatic mixing valve according to claim 1, wherein the gear stage has as an input element that is a drive spindle of the electric motor, the drive spindle being operationally connected to the linear displacement shaft, and wherein, for a formation of an operational connection, the drive spindle has an outer thread which is in engagement with a radially inner thread of the linear displacement shaft.

5. The thermostatic mixing valve according to claim 1, wherein an overload element, which is elastically flexible in an excessively large force application, and a thermostat that is motion-coupled to the valve body, follows in a force flow direction after the linear displacement shaft in a series connection, the overload element being a hollow cylinder having a front wall facing the linear displacement shaft and a rear wall facing the thermostat and wherein a spring is disposed inside the hollow cylinder.

6. The thermostatic mixing valve according to claim 5, wherein the linear displacement shaft is brought into contact with the front wall.

7. The thermostatic mixing valve according to claim 5, wherein the overload element, the thermostat, and the valve body are combined into a housing and form a first subassembly unit, and wherein the electric motor with the control unit and the linear displacement shaft form a second subassembly unit, which in an assembled state is operationally connected to the first subassembly unit.

8. The thermostatic mixing valve according to claim 1, wherein the linear displacement shaft has a signal generator or a radially projecting vane that works together with the sensor.

9. The thermostatic mixing valve according to claim 1, wherein the control unit and the electric motor of the thermostatic mixing valve are integrated into a control loop for regulating an actual mixed water temperature to the target mixed water temperature preset on a user side.

10. The thermostatic mixing valve according to claim 1, wherein the valve body is linearly displaceable.

11. The thermostatic mixing valve according to claim 2, wherein the linear displacement shaft has a radially projecting vane that works together with the sensor, wherein a distal end of the vane opposes the sensor.

12. The thermostatic mixing valve according to claim 11, wherein the distal end of the radially projecting vane has slits provided therein, wherein two of the slits correspond respectively to the bottom set position and the top set position.

* * * * *